United States Patent [19]

Myers et al.

[11] 4,156,473
[45] May 29, 1979

[54] HITCH ADAPTER

[75] Inventors: Glenn L. Myers, Ottumwa; Ronald N. Grimstad, Waterloo; Marlyn L. Jerke; David L. Wolf, both of Cedar Falls, all of Iowa

[73] Assignee: Deere & Company, Moline, Ill.

[21] Appl. No.: 850,348

[22] Filed: Nov. 10, 1977

[51] Int. Cl.$^2$ ............................................. B60D 1/00
[52] U.S. Cl. ................................................ 180/14 R
[58] Field of Search ............... 180/53, 14 R; 280/462, 280/467, 474, 482; 85/50 R; 151/35

[56] References Cited

U.S. PATENT DOCUMENTS

| | | | |
|---|---|---|---|
| 2,271,732 | 2/1942 | Chappuis | 151/35 |
| 2,846,250 | 8/1958 | Davis | 85/50 R X |
| 3,059,589 | 10/1962 | Schreyer | 85/50 R |
| 3,557,892 | 1/1971 | Burrough | 180/14 R |

Primary Examiner—Joseph F. Peters, Jr.
Assistant Examiner—Michael Mar

[57] ABSTRACT

A hitch adapter connects a tractor drawbar to an implement hitch pin and includes a cast housing having top and bottom walls and a forwardly open chamber that receives the rearward end of the tractor drawbar. The housing has a pair of vertical openings elongated in a transverse direction and receiving vertical bolts having nuts at their lower ends which are tightenable to clamp the housing between the head of the bolt and the nut. The shanks of the bolts are disposed on opposite ends of the drawbar and are shiftable laterally in the openings to engage the opposite side of the drawbar to limit lateral movement of the housing relative to the drawbar, the nuts being tightened to clamp the bolts in the selected position. Serrated surfaces are provided on both the top and bottom of the housing around the openings, and each bolt is provided with a pair of washers having serrated surfaces that respectively engage the serrated surfaces on the top and bottom of the housing. The serrations on said surfaces run in a fore and aft direction, and when the nuts are tightened on the bolts to clamp the serrations on the washers onto the serrations on the housing, lateral slippage of the bolts along the slot-like openings in the housing is eliminated.

9 Claims, 5 Drawing Figures

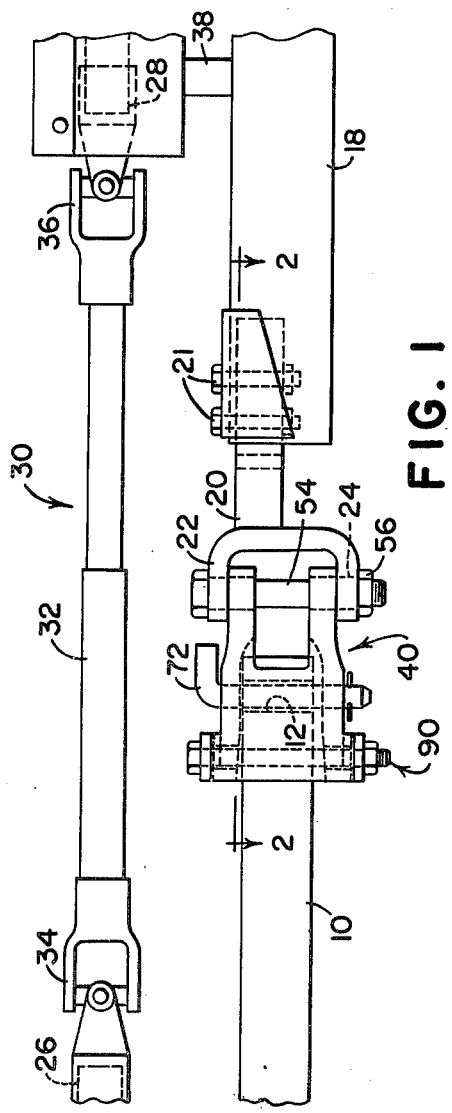
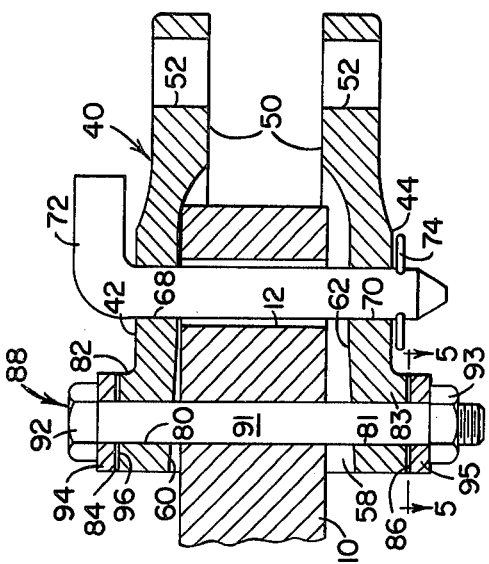
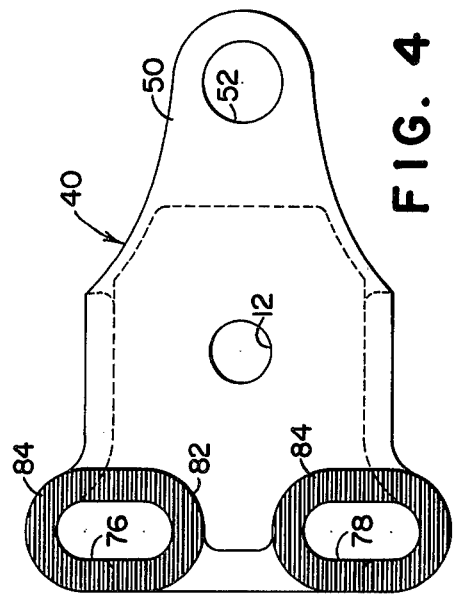
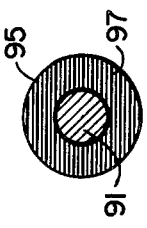
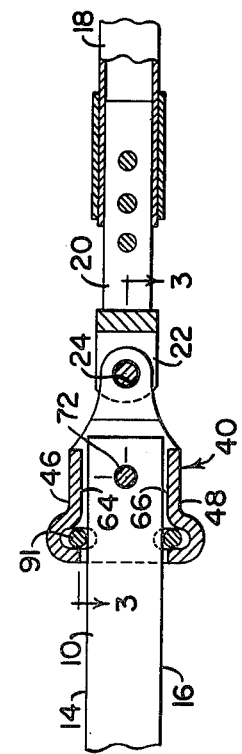

HITCH ADAPTER

BACKGROUND OF THE INVENTION

This invention relates to a hitch adapter for connecting a tractor drawbar to the tongue of a trailing implement wherein the vertical pivot axis between the tractor and the implement is located equidistantly between the front and rear universal joints of a power takeoff hookup assembly that connects the tractor power takeoff to the implement driveshaft.

A hitch adapter of the above general type is disclosed in U.S. Pat. No. 3,557,892, which is also assigned to the assignee herein.

As described in said patent, the location of the vertical pivot point equidistantly between the front and rear universal joints is highly desirable to provide equal angles of articulation at the front and rear universal joints when there is articulation about a vertical axis between the implement and the tractor, to thereby provide constant speed in the drive train eliminating speed variations and vibrations in the drive system.

One of the problems with such hitch adapters resides in the fact that the sizes of the tractor drawbars vary widely according to the size of the tractor and the manufacturer of the tractor. Accordingly, since the hitch adapter must be laterally rigid with the tractor drawbar, it has been found necessary to provide some type of adjustment in the hitch adapter so that it can be mounted on different size drawbars. In said U.S. Pat. No. 3,557,892, said adjustment is accomplished by providing vertical bolts that are adjustable along angled slots to vary the spacing between the bolts, the bolts engaging the opposite sides of the drawbar to vary the effective width of the cavity in the adapter housing that receives the drawbar. However, since the entire towing force between the tractor and the implement is transmitted through the hitch adapter, relatively large forces are involved, and it has been found that the forces are sufficiently large to frequently shift the bolts and thereby loosen the adapter on the drawbar. Of course, the tighter the bolts are tightened, the greater the resistance to such shifting, but is has been found that it is difficult to obtain sufficient torque on the bolts and nuts to prevent the lateral sliding of the bolts with conventional tools readily available to the farmer when adjusting the adapter for a particular tractor drawbar.

SUMMARY OF THE INVENTION

According to the present invention, there is provided an improved adapter for connecting the forward end of a towed implement to the tractor drawbar while providing equiangular articulation in the universal joints of the drive extending across the pivotal connection between the implement and the tractor. More specifically, there is provided an improved means for locking the laterally adjustable bolts that engage the opposite sides of the tractor drawbar to limit lateral shifting of the adapter on the drawbar, the adjustment of the bolts being provided to accommodate different widths of tractor drawbars.

An important feature of the invention resides in the provisions of serrated surfaces on the top and bottom walls of the hitch adapter housing underneath the bolt heads and the nuts to resist lateral shifting on the bolts once they are tightened. Still more specifically, serrated washers are provided between the bolt head and the nut and the housing serrated surfaces, the washers having serrations that conform to the serrations on the housing to further limit lateral shifting of the bolts. Another feature of the invention resides in the fact that the serrations extend in a fore and aft direction to limit the lateral shifting. Also, the bolts are mounted in laterally elongated openings or slots, as opposed to angled slots in the earlier adapters, the transversely extending slots reducing the overall length and consequently the weight of the hitch adapter, the angled slots no longer being necessary since the improved locking device eliminates the need for the angled slots that were deemed necessary to provide sufficient resistance to lateral movement of the bolts.

BRIEF DESCRIPTION OF THE DRAWINGS

FIG. 1 is a side elevation view of the rearward portion of a tractor drawbar and the forward portion of an implement tongue including the PTO hookup shaft and the improved hitch adapter for connecting the drawbar to the tongue.

FIG. 2 is a sectional plan view as viewed along the line 2—2 of FIG. 1.

FIG. 3 is an enlarged fore and aft, vertical section through the hitch adapter along the line 3—3 of FIG. 2.

FIG. 4 is an enlarged plan view of the hitch adapter housing.

FIG. 5 is a section view as viewed along the line 5—5 of FIG. 3.

DESCRIPTION OF THE PREFERRED EMBODIMENT

The invention is embodied in a tractor trailing implement combination, wherein the tractor includes a rearwardly extending drawbar 10, having a vertical bore 12 adjacent its rearward end, only the rearward portion of the drawbar being illustrated in the drawings. The drawbar has a rectangular cross section with right and left vertical sides 14 and 16 respectively. The drawbar is connectible to an implement tongue 18 having a hitch member 20 attached to its forward end by means of bolts 21, only the forward portion of the implement tongue being shown in the drawings. The hitch member 20 includes a bifurcated forward portion forming a pair of forwardly extending vertically spaced arms 22 having a vertical bore 24 through the opposite arms.

The tractor has a rearwardly extending PTO output shaft 26 above the drawbar 10 as is well known, and the implement has a fore and aft driveshaft 28 above the tongue, only the extremities of each shaft being schematically shown in the drawings. A hookup or power transmitting assembly 30 drivingly interconnects the PTO shaft 26 and the implement driveshaft 28. The hookup assembly includes a telescoping central shaft portion 32, which accommodates articulation between the implement and the tractor, and front and rear universal joints 34 and 36 at the front and rear ends of the hookup assembly, the front universal joint 34 being releasably connected to the tractor PTO shaft as is well known. The front of the implement driveshaft 28 and consequently the hookup assembly 30 is supported on the implement tongue by a support structure 38.

The hitch adapter includes a cast housing 40 having top and bottom walls 42 and 44 respectively and right and left side walls 46 and 48 respectively. The housing has a pair of vertically spaced rearwardly extending arms 50 extending rearwardly from the top and bottom walls and having a vertical bore 52 through the arms 50 adjacent their rearward ends. The upper and lower arms 50 are respectively disposed on the inner sides of the arms 22 of the hitch member 20 with the bore 52 in alignment with the bore 24, and a vertical bolt 54 extends downwardly through the bores to form a vertical pivot means that permit articulation of the housing 40 relative to the hitch member 20 about a vertical axis. A nut 56 is threaded on the threaded end of the bolt to retain the pivot bolt 54 in the respective bores. As described in greater detail in said U.S. Pat. No. 3,557,892, the axis of the pivot means formed by the bolt 54 is spaced equidistantly between the vertical axes of articulation of the front and rear universal joints 34 and 36 to provide equiangular articulation at the universal joints when the implement is articulated relative to the tractor.

The housing has a central fore and aft extending cavity 58 that extends entirely through the housing, although the cavity 58 is somewhat larger at the forward end of the housing. The forward end of the cavity 58 has a generally rectangular cross section with top and bottom walls 60 and 62 respectively that diverge slightly in a forward direction. The cavity also has right and left vertical sidewalls 64 and 66 which are spaced apart a greater distance than the width of most tractor drawbars, the height of the cavity also being greater than the vertical thickness of a conventional drawbar so that the rearward end of any conventional drawbar is insertible into the cavity. The top and bottom walls 60 and 62 respectively have upper and lower vertically aligned bores 68 and 70 that are aligned with the drawbar bore 12 when the housing is properly installed on the tractor drawbar. A hitch pin 72 is insertible downwardly through the upper bore 68, the tractor drawbar bore 12, and the lower bore 70 to restrain fore and aft separation of the housing from the drawbar, a locking pin 74 being provided at the lower end of the hitch pin 72 to lock the pin in position as shown in FIG. 2. Sufficient clearance has been provided between the pin 72 and the drawbar bore 12 and between the top and bottom walls of the cavity and the top and bottom of the drawbar to permit a limited degree of articulation between the housing and the drawbar about a transverse horizontal axis, such as would occur when the tractor is pulling the implement through a ditch or over a rise, the diverging top and bottom walls of the cavity also permitting the necessary articulation.

A pair of vertical openings 76 and 78 extend vertically through the housing adjacent the forward end of the housing, the openings 76 and 78 being spaced equidistantly on opposite sides of the fore and aft center line of the housing. Each opening includes an upper part 80 and a lower part 81 that respectively extend through the housing top wall 42 and the bottom wall 44. The openings are identical and are transversely elongated to form a transverse slot with rounded ends. The housing top wall 42 has a pair of bosses 82 around the upper part 80 of the opening and a similar boss 83 on the bottom surface of the bottom wall 44 around the lower part of the opening. A serrated surface 84 is provided on top of the upper boss 82 completely around and adjacent the upper opening, and similarly a lower serrated surface 86 is provided on the bottom surface of the lower boss 83 around the lower part of the opening. As shown in FIG. 4, the serrations extend in a fore and aft direction or perpendicular to the direction of elongation of the adjacent opening.

Right and left clamping means 88 and 90 are respectively disposed in the right and left vertical openings 76 and 78. The clamping means are identical and are comprised of a vertical bolt 91 extending downwardly through the upper and lower parts of the vertical openings, each bolt having a head 92 opposite the upper serrated surface 84 and a nut 93 opposite the lower serrated surface. Upper and lower washers 94 and 95 are respectively disposed between each bolt head 92 and nut 93 and the opposite upper and lower serrated surfaces 84 and 86, the upper washer being provided with serrations 96 on its lower surface while the lower washer 95 is provided with serrations 97 on its upper surface, so that the serrations 96 and 97 on the washers respectively are engageable with the serrated surfaces 84 and 86. As best shown in FIG. 5, the serrations on the washers also extend in a fore and aft direction and mesh with the housing serrations.

In operation, the hitch adapter normally remains with the implement tongue 18, and when the implement is to be connected to the tractor drawbar, the bolt type clamping means 88 and 90 are loosened and adjusted outwardly to provide sufficient clearance between the shank portions of the bolts 91 to accommodate the width of the tractor drawbar 10. The drawbar is then inserted into the cavity 58 until the drawbar bore 12 is aligned with the vertical bores 68 and 70 in the housing 40, whereupon the hitch pin 72 is dropped through the aligned bores to lock the implement to the tractor. The bolts 91 are then slid laterally along the slot-like openings 76 and 78 until the shanks of the bolts 91 engage the opposite sides of the tractor drawbar. The bolts are then tightened, the axial compression force exerted by the bolt head and nut on the serrated washers 94 and 95 forcing the serrated surfaces of the washers into meshing engagement with the serrated surfaces 84 and 86 on the housing. Since the serrations run in a fore and aft direction, they strongly resist any lateral shifting of the botls along the slot-like openings, and since the bolts have approximately the same diameter as the width of the openings, fore and aft movement of the bolts in the direction of the serrations is impossible. Since the bolts 91 are locked by the serrated surfaces, it is not necessary to apply a high torque to the bolts to prevent their slippage and consequently, adjustment of the hitch adapter for the different tractor drawbar can be easily accomplished with readily available tools.

We claim:

1. In a tractor-trailing implement combination wherein the tractor includes a rearwardly extending drawbar, having a generally rectangular cross section and a vertical pivot bore, and a rearwardly extending PTO output shaft and the implement includes a tongue having a forward hitch member with a vertical pivot element and an implement drive shaft connected and driven by the PTO output shaft by a power transmitting assembly having front and rear universal joints respectively having vertical axes of articulation spaced generally equidistant, forwardly and rearwardly from the axis of the vertical pivot element, the combination therewith of an improved hitch adapter for connecting the drawbar to the implement hitch member and comprising:

a housing mounted on the rearward end of the drawbar and having top and bottom walls, a forwardly open chamber having a larger cross section than the drawbar and encompassing the rearward end of the drawbar, and a vertical bore through said top and bottom walls aligned with the vertical bore in the drawbar;

a vertical pin means extending through the aligned vertical bores in the housing top and bottom walls and the drawbar;

a vertical pivot means mounted on the housing rearwardly of the pin means and coaxially connected to the vertical pivot element of the implement hitch member;

a pair of transversely spaced vertical openings extending vertically through the housing forwardly of and respectively on opposite sides of the vertical bore through the housing top and bottom walls, said opening being elongated in an angular direction relative to a fore and aft direction and communicating with the housing cavity;

a pair of serrated surfaces on the exterior of at least one of the housing walls respectively adjacent the vertical openings and having parallel serrations extending at an angle to the direction of elongation of the openings;

and a pair of vertical clamp means respectively having vertical shank portions extending through the respective openings and engageable with the opposite lateral sides of the drawbar to limit lateral movement of the housing relative to the drawbar, each clamp means having upper and lower abutment means at opposite ends of the shank portion and engageable with the top and bottom of the housing, at least one of the abutment means being selectively vertically shiftable to exert a releasable vertical clamping force between the abutment means against the top and bottom walls of the housing, at least one of the abutment means including a friction element having a serrated surface opposite to and engageable with the serrated surface adjacent the opening to lock the clamping means shank portion in a selected position in the opening when the clamping means exerts said clamping force.

2. The invention defined in claim 1 wherein serrated surfaces are provided adjacent the openings on the exterior surfaces of both the top and bottom walls and a friction element is provided on both the upper and lower abutment means, each friction element including a serrated surface opposite and engageable with the serrated surface on the housing.

3. The invention defined in claim 2 where the serrated surfaces substantially surround the openings on the top and bottom walls.

4. The invention defined in claim 3 where the serrations of the serrated surfaces on the housing extend in a direction substantially normal to the direction of elongation of the opening.

5. The invention defined in claim 4 wherein each clamping means comprises a vertical bolt extending through the opening and a nut threadable on the bolts, the bolt head and the nut at least partially forming said abutment means, the shank of the bolt being disposed in the opening and having a diameter substantially the same as the width of the opening and substantially less than the length of the opening, so that the bolt is shiftable only lengthwise of the opening.

6. The invention defined in claim 5 wherein each opening is elongated in a transverse direction relative to the length of the drawbar, the serration on the housing surface extending in a fore and aft direction.

7. The invention defined in claim 2 where the serrations of the serrated surfaces on the housing extend in a direction substantially normal to the direction of elongation of the opening.

8. The invention defined in claim 2 wherein each opening is elongated in a transverse direction relative to the length of the drawbar, the serration on the housing surface extending in a fore and aft direction.

9. The invention defined in claim 7 wherein each clamping means comprises a vertical bolt extending through the opening and a nut threadable on the bolts, the bolt head and the nut at least partially forming said abutments, the shank of the bolt being disposed in the opening and having a diameter substantially the same as the width of the opening and substantially less than the length of the opening, so that the bolt is shiftable only lengthwise of the opening.

* * * * *